United States Patent [19]

Hoffman et al.

[11] Patent Number: 4,623,816
[45] Date of Patent: Nov. 18, 1986

[54] FLUORESCENT LAMP USING MULTI-LAYER PHOSPHOR COATING

[75] Inventors: Mary V. Hoffman, South Euclid; John Paynter, Painesville, both of Ohio

[73] Assignee: General Electric Company, Schenectady, N.Y.

[21] Appl. No.: 726,196

[22] Filed: Apr. 22, 1985

[51] Int. Cl.[4] .......................... H01J 1/63; H01J 61/44
[52] U.S. Cl. .................................................. 313/487
[58] Field of Search ............... 313/487, 484, 485, 486; 252/301.4 P

[56] References Cited

U.S. PATENT DOCUMENTS

| | | | |
|---|---|---|---|
| 3,937,998 | 2/1976 | Verstegen et al. | 313/487 |
| 4,075,532 | 2/1978 | Piper et al. | 313/497 |
| 4,088,923 | 5/1978 | Manders | 313/487 |
| 4,423,349 | 12/1983 | Nakajima et al. | 313/487 |
| 4,447,756 | 5/1984 | Kohmoto et al. | 313/487 |

FOREIGN PATENT DOCUMENTS

| | | | |
|---|---|---|---|
| 54-52881 | 4/1979 | Japan | 313/487 |
| 2142775 | 1/1985 | United Kingdom | 313/486 |

*Primary Examiner*—Stewart J. Levy
*Assistant Examiner*—Joseph W. Roskos
*Attorney, Agent, or Firm*—J. F. McDevitt; Philip L. Schlamp; Fred Jacob

[57] ABSTRACT

A fluorescent lamp utilizing a dual phosphor layer coating is disclosed producing efficient white color illumination at a lower cost than conventional phosphor coatings of the same type. The base layer in the phosphor coating comprises a conventional calcium haloapatite phosphor whereas the top phosphor layer comprises a tri-phosphor blend including a lanthanum cerium orthophosphate phosphor activated with terbium ion as the green color component along with a modified europium-activated yttrium oxide phosphor as the red color component.

4 Claims, 1 Drawing Figure

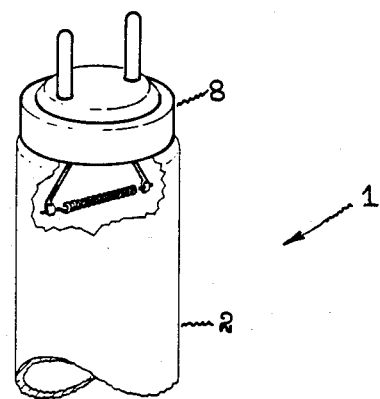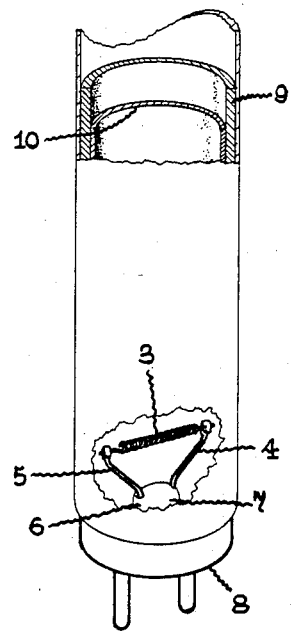

FLUORESCENT LAMP USING MULTI-LAYER PHOSPHOR COATING

BACKGROUND OF THE INVENTION

This invention relates generally to fluorescent lamps utilizing a blend of at least two phosphors to produce a high light output together with good color rendition. More particularly, this invention deals with a blended mixture of at least two particular phosphor materials which produce these desired results when substituted for the conventional components now being used in fluorescent lamps.

Efficient illumination along with good color rendition is now provided in fluorescent lamps with various combinations of three narrow band emitting phosphor materials each producing red, blue or green color emission. For example, there is disclosed in U.S. Pat. No. 3,937,998 a combination of said type phosphor materials found useful in low pressure type mercury vapor discharge lamps wherein the blue color emission phosphor exhibits an emission band in the wavelength range from about 430 nanometers wavelength up to about 490 nanometers wavelength, the red color emission phosphor exhibits an emission band in a wavelength range from about 590 nanometers wavelength up to about 630 nanometers wavelength, and with the green color emission phosphor producing emission extending from 520 nanometers wavelength up to about 565 nanometers wavelength, said phosphor combination producing efficient white color illumination. In U.S. Pat. No. 4,088,923 there is also disclosed a particular utilization of said phosphor combination as a top layer in a dual layer phosphor coating which is said to reduce the cost of these relatively expensive phosphor materials in a fluorescent lamp. Specifically, a thin layer of this tri-phosphor combination can be deposited on the surface of a conventional calcium haloapatite phosphor material to produce the desired high light output with good color rendition at a considerable cost savings for the overall phosphor combination.

Various other narrow band emitting phosphor materials which are relatively less expensive than the above referenced high cost phosphors can also be employed in this type phosphor combination. For example, a green color emitting terbium-activated lanthanum cerium orthophosphate phosphor is disclosed in U.S. Pat. No. 4,423,349 as a lower cost substitute for the terbium and cerium co-activated magnesium aluminate phosphor component in said phosphor combination. Similarly, a lower cost europium-activated strontium chloroapatite phosphor can be substituted for europium-activated baruim magnesium aluminate phosphor to serve as the narrow band blue color emission phosphor component in a different phosphor combination used to provide efficient white color illumination in a fluorescent lamp. Specifically, the latter type phosphor coating is disclosed in U.S. Pat. No. 4,075,532 wherein the improved coating comprises a first phosphor having a relatively broad emission spectrum with a mean wavelength in the yellow portion of the visible spectrum which is blended with a second phosphor having said relatively narrow emission spectrum in the blue portion of the visible spectrum and with said first and second phosphors being uniformly blended together in a proportional relationship pre-selected to provide increased luminous efficacy for said mixture.

It is a primary object of the present invention, therefore, to provide a still lower cost phosphor combination useful in fluorescent lamps to produce efficient emission equal to, or better than, is currently obtained with conventional phosphor materials.

It is another important object of the present invention to provide a novel lower cost blend of phosphor materials producing white color emission in a fluorescent lamp at equal or better light output and good color rendition.

Other ojbects of the present invention will become apparent to those skilled in the art upon consideration of the detailed description hereinafter provided.

SUMMARY OF THE INVENTION

It has now been discovered that a blended mixture of a particular lanthanum cerium orthophosphate phosphor activated with terbium and another particular europium-activated yttrium oxide phosphor produces higher luminous efficiency in the fluorescent lamp than is obtained with conventional phosphor blends. The selected lanthanum cerium orthophosphate phosphor can be represented by the general formula

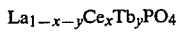
$$La_{1-x-y}Ce_xTb_yPO_4$$

wherein
x is in the approximate range 0.05–0.60, and
y is in the approximate range 0.05–0.20,
whereas the selected europium-activated yttrium oxide phosphor has the general formula

$$(Y_{1-a}Eu_a)_2O_3$$

wherein a in in the approximate range 0.015–0.040. Blending said phosphor components in pre-determined amounts can produce white color illumination in high output type fluorescent lamps by reason of blue color emission being obtained from the discharge in these lamps. In the preferred embodiments, however, a third narrow band blue color emission phosphor component is combined in the phosphor mix to produce higher luminous efficiency white color emission than is obtained with conventional phosphor blends.

In especially preferred embodiments of the present invention, a tri-phosphor blend is employed as the top layer in a dual layer phosphor coating having a conventional calcium haloapatite phosphor as the base layer. More particularly, a lower overall cost phosphor coating can be provided in this manner wherein the top tri-phosphor layer represents approximately 2–24 weight percent of the total phosphor coating weight. Higher weight proportions of the tri-phosphor layer increase color rendition. A representative 40 watt size T-12 fluorescent lamp of this type employs a top tri-phosphor coat utilizing approximately 5% by weight of europium-activated strontium barium calcium chlorophosphate as the blue color emission phosphor component, approximately 27.5 weight percent of the aforementioned terbium activated lanthanum cerium orthophosphate phosphor as the green color emission phosphor component, and approximately 67.5 weight percent of the aforementioned europium-activated yttrium oxide phosphor component to produce white color illumination at a 3000° K. lamp color point. A 4000° K. color point lamp can be achieved with a tri-phosphor blend according to the invention as a top layer in representative proportions of 13.0 weight percent blue color emission phosphor, 35.5 weight percent green color emission phosphor component, and 51.5 weight percent red color emission phosphor component. Surprisingly, higher light output is produced in said representative lamps as compared with dual coated lamps utilizing a conventional tri-phosphor blend despite the fact that both the red and green color emission phosphor components in the present phosphor blends exhibit lower brightness than the replaced phosphor components.

BRIEF DESCRIPTION OF THE DRAWING

In the accompanying drawing, there is shown a perspective view partially broken away of a low pressure mercury discharge fluorescent lamp construction utilizing a dual layer phosphor coating in accordance with the present invention.

DESCRIPTION OF THE PREFERRED EMBODIMENTS

Referring to the accompanying drawing, there is depicted a representative fluorescent lamp 1 comprising an elongated soda-lime silicate glass envelope 2 having a circular cross section. The low pressure mercury discharge assembly in said lamp includes a conventional electrode structure 3 at each end connected to lead-in wires 4 and 5 which extend through a glass press seal 6 in a mount stem 7 to the electrical contacts of a base 8 fixed at both ends of the sealed glass envelope. The discharge-sustaining filling in the sealed glass envelope is an inert gas such as argon or a mixture of argon and other rare earth gases at a low pressure in combination with a small quantity of mercury to provide the low vapor pressure manner of lamp operation. The inner surface of the glass bulb is provided with a phosphor coating 9 which can be conventional calcium haloapatite phosphor material co-activated with antimony and manganese to provide white color illumination at the desired lamp color point. Deposited on the surface of said phosphor base layer 9 is a tri-phosphor top coat blend 10 according to the present invention and which can be in the hereinbefore specified weight proportions as a means to lower the costs of the overall phosphor coating. As specific embodiments further describing said improved tri-phosphor blend, a number of the above described fluorescent lamps having the known F40 T12WM construction were built and tested for comparison with prior art lamps using conventional phosphor materials in the same type lamp construction. Both type lamps included on optically transparent tin oxide conductive layer deposited on the glass surface as a starting aid.

EXAMPLE I

Lamps according to the present invention exhibiting a 3000° K. color point were built utilizing approximately 0.93 grams of a tri-phosphor blend superposed on a 6.6 gram deposit of a warm white type calcium haloapatite phosphor. The particular tri-phosphor blend utilized approximately 5 weight percent of a commercially available blue color emission phosphor being sold by Nichia Chemical Industries as type NP105 material, approximately 27.5 weight percent of a commercially available green color emission phosphor being sold by the same Nichia company as type NP220 phosphor, and approximately 67.5 weight percent of a europium-activated yttrium oxide phosphor with a europium mole fraction of approximately 0.0275. Said test lamps measured 2857 lumens after 100 hours burning at a CRI value of 68. The conventional dual layer phosphor coated lamps tested for comparison employed a top layer blend of approximately 5 weight percent europium-activated barium magnesium aluminate phosphor, approximately 30 weight percent cerium and terbium co-activated magnesium aluminate phosphor, and approximately 65 weight percent of a conventional europium-activated yttrium oxide phosphor having a europium-activator content of approximately 0.045 mole fraction. Said conventional lamps measured 2858 lumens after 100 hours burning at a CRI value of 70.

EXAMPLE II

Still other F40 T12WM type fluorescent lamps according to the present invention were built and tested for comparison with prior art lamps wherein both type lamps utilized still higher top tri-phophor coating weights and exhibited a 4000° K. color point. The present lamp utilized approximately 2.2 grams of a tri-phosphor blend containing about 13 weight percent of the aforementioned NP105 blue color emission phosphor, about 35.5 weight percent of the aforementioned NP220 green color emission phosphor, and about 51.5 weight percent of the aforementioned lower europium content yttrium oxide red color emission phosphor. Said tri-phosphor blend was deposited on the surface of approximately 4.6 gram base layer of a conventional cool-white calcium haloapatite phosphor. These test lamps measured 2978 lumens (100 hours) at a 77 CRI value as compared with 2837 lumens and a 80 CRI value being measured upon prior art lamps employing a thicker 2.6 gram top coat deposit of the conventional tri-phophor blend.

In connection with the foregoing test results, it should be noted that light output and CRI values in said lamps are governed in a particular manner depending upon the weight proportions of the top tri-phosphor coat which are being employed. At a 2–24 weight percent range of the total phosphor coating weight where cost savings are greatest, the lamp performance characteristics of interest have been found to vary in direct relationship with the top coating proportion. Specifically, both light output and CRI increase in direct proportion to an increase in the top coating fraction. At higher top coating weight fractions of tri-phosphor up to about 40 weight percent which provide lesser cost savings, however, both light output and CRI values in the lamp are close to the maximum values which can be achieved when the phosphor coating employs tri-phosphor components along. The noted observations are apparent in the foregoing test results wherein lamps according to the present invention which employ a 0.93 gram deposit of the tri-phosphor blend measured less lumen and CRI values than measured when a 2.2 gram tri-phosphor deposit was employed.

It will be apparent from the foregoing description that while specific examples have been provided on representative lamps used in the practice of the present invention, that various modifications thereof can be made within the spirit and scope of the present invention. For example, the proportions of phosphor constituents in a given phosphor blend, according to the present invention, will vary other than the above specified if different lamp color points are desired. Additionally, it is further contemplated to introduce still other constituents in the top and bottom layers of the presently improved phosphor coating for various fluorescent lamp applications in order to achieve still further cost savings. It is intended to limit the present invention, therefore, only by the scope of the following claims:

What we claim as new and desire to secure by Letters Patent of the United States is:

1. In a fluorescent lamp comprising a glass envelope having electrodes at its ends, a mercury and inert gas filling within said envelope which produces ultraviolet radiation, and a phosphor coating which converts a substantial portion of said ultraviolet radiation to visible illumination having a white color, the improvement wherein said coating comprises a dual layer of a first phosphor layer deposited on the inner glass surface and a second phosphor layer deposited on the first phosphor layer, said first phosphor layer comprising a calcium haloapatite phosphor exhibiting the desired white color point, and said second phosphor layer comprising a tri-phosphor blend employing a blue color emission phosphor, a lanthanum cerium orthophosphate phosphor activated with terbium ion having the general formula:

$$La_{1-x-y}Ce_xTb_yPO_4$$

wherein
x is in the approximate range 0.05–0.60, and
y is in the approximate range 0.05–0.20, and a europium-activated yttrium oxide phosphor having the general formula:

$$(Y_{1-a}Eu_A)_2O_3$$

wherein a is in the approximate range 0.016–0.040, said phosphors in the second phosphor layer also being blended in proportions to produce the desired white color point, and said phosphor coating producing higher luminous efficiency than is obtained with a conventional phosphor coating of the same type but at a reduced total phosphor cost.

2. A fluorescent lamp as in claim 1 wherein said phosphor coating further includes an underlayer of an optically transparent conductive coating deposited on the inner glass surface.

3. A fluorescent lamp as in claim 1 wherein said blue color emission phosphor is selected from europium-activated strontium chlorophosphate, europium-activated strontium barium calcium chlorophosphate, and europium-activated barium magnesium aluminate, including mixtures thereof.

4. A fluorescent lamp as in claim 1 wherein said glass envelope comprises a cylindrical tube.

* * * * *